US011420820B2

(12) United States Patent
Panu et al.

(10) Patent No.: US 11,420,820 B2
(45) Date of Patent: Aug. 23, 2022

(54) WASTE BIN CARRIER AND AUTOMATED RECEPTACLE HANDLING SYSTEM

(71) Applicant: Thermo Fisher Scientific Oy, Vantaa (FI)

(72) Inventors: Jarkko Panu, Vantaa (FI); Ville Mäkelä, Vantaa (FI); Sami Paavilainen, Vantaa (FI)

(73) Assignee: Thermo Fisher Scientific Oy, Vantaa (FI)

( * ) Notice: Subject to any disclaimer, the term of this patent is extended or adjusted under 35 U.S.C. 154(b) by 371 days.

(21) Appl. No.: 16/612,779

(22) PCT Filed: May 8, 2018

(86) PCT No.: PCT/FI2018/050336
§ 371 (c)(1),
(2) Date: Nov. 12, 2019

(87) PCT Pub. No.: WO2018/206845
PCT Pub. Date: Nov. 15, 2018

(65) Prior Publication Data
US 2020/0148465 A1  May 14, 2020

(30) Foreign Application Priority Data

May 12, 2017  (FI) .................................. 20175433

(51) Int. Cl.
*B65F 1/14* (2006.01)
*B01L 9/00* (2006.01)
(Continued)

(52) U.S. Cl.
CPC .............. *B65F 1/1468* (2013.01); *B01L 1/50* (2013.01); *B01L 9/00* (2013.01); *B62B 3/04* (2013.01);
(Continued)

(58) Field of Classification Search
CPC . B65F 1/1468; B01L 1/50; B01L 9/00; B62B 3/04; B62B 3/10; B62B 2202/20; B62B 2203/00
See application file for complete search history.

(56) References Cited

U.S. PATENT DOCUMENTS 1,475,483 A * 11/1923 Galuska .................... B65F 3/00
                                                     280/79.2
3,028,015 A *  4/1962 Williams ............... B65F 1/163
                                                     211/83
(Continued)

FOREIGN PATENT DOCUMENTS

CA        2509567 A1   12/2006
CN     105116158 A     12/2015
(Continued)

*Primary Examiner* — Jacob B Meyer
(74) *Attorney, Agent, or Firm* — Laine IP Oy

(57) ABSTRACT

A novel waste bin carrier (100) is proposed for carrying at least one waste bin (200). The waste bin carrier (100) includes a frame (110) having a base (130) for receiving thereon one waste bin (200) or more. The waste bin carrier (100) also has a locking mechanism (120) movably attached to the frame (110) for releasably securing at least one waste bin (200) to the waste bin carrier (100). The locking mechanism (120) has a pusher guide (121) that extends in a first horizontal Cartesian dimension (X) for lateral engagement with the waste bin (200). The locking mechanism also has at least one articulated arm (122) that connects the pusher guide (121) to the frame (110) of the waste bin carrier (100) for allowing movement of the pusher guide (121) in respect to the frame (110) between the deployed state and the released state.

17 Claims, 7 Drawing Sheets

(51) Int. Cl.
 *B01L 1/00* (2006.01)
 *B62B 3/04* (2006.01)
 *B62B 3/10* (2006.01)

(52) U.S. Cl.
 CPC ............ *B62B 3/10* (2013.01); *B62B 2202/20* (2013.01); *B62B 2203/00* (2013.01)

(56) References Cited

U.S. PATENT DOCUMENTS

| | | | | |
|---|---|---|---|---|
| 3,065,858 | A * | 11/1962 | Raymond | B65F 1/141 211/84 |
| 3,191,960 | A * | 6/1965 | Turner | B65F 1/1436 280/47.19 |
| 3,292,795 | A * | 12/1966 | Chappell | B62B 1/264 211/85.19 |
| 3,749,414 | A * | 7/1973 | Lynn | B62B 1/264 280/47.19 |
| 3,907,117 | A * | 9/1975 | Williams | B65F 1/141 211/85.19 |
| 4,313,612 | A * | 2/1982 | Rubens | B62B 3/04 280/79.5 |
| 4,670,227 | A * | 6/1987 | Smith | A61L 11/00 422/297 |
| 5,110,147 | A | 5/1992 | Gershman | |
| 5,135,245 | A * | 8/1992 | Pagone | B62B 3/10 220/23.4 |
| 6,676,141 | B1 * | 1/2004 | Hadley | B62B 3/04 220/909 |
| 6,867,393 | B1 * | 3/2005 | Lewis | A61L 11/00 219/401 |
| 7,815,851 | B1 * | 10/2010 | Lewis | A61L 2/24 422/3 |
| 8,695,834 | B2 * | 4/2014 | Panek, Jr. | B65F 1/1468 220/345.1 |
| 2004/0061298 | A1 | 4/2004 | Sandoval | |
| 2009/0206569 | A1 * | 8/2009 | Begin | B62B 3/10 280/47.35 |
| 2011/0057405 | A1 * | 3/2011 | Filasky | B62B 5/0013 280/79.5 |
| 2011/0109056 | A1 * | 5/2011 | Hutchinson | B62B 3/04 280/79.2 |

FOREIGN PATENT DOCUMENTS

| | | | | |
|---|---|---|---|---|
| CN | 106080715 | A * | 11/2016 | |
| CN | 106080715 | B * | 5/2018 | |
| CN | 110709340 | A * | 1/2020 | ............ B65F 1/1468 |
| EP | 0204879 | A1 | 12/1986 | |
| EP | 2407398 | A2 | 1/2012 | |
| EP | 3045375 | A1 * | 7/2016 | ............. B66F 9/187 |
| EP | 2864796 | B1 | 9/2016 | |

* cited by examiner

WASTE BIN CARRIER AND AUTOMATED RECEPTACLE HANDLING SYSTEM

FIELD

The present disclosure relates to equipment for automated receptacle handling. In particular, the present disclosure relates to waste management of automated receptacle handling devices, such as storages, cold storages, and automated chemical analysers. More specifically, the present disclosure relates to a waste bin carrier for an automated receptacle handling device and an automated receptacle handling system having an automated receptacle handling device and a waste bin carrier.

BACKGROUND

It is common practice to perform chemical tests in automated systems that are capable of storing, moving, manipulating, and discarding receptacles carrying the samples that are subject to analysis or storage. Receptacles may include sample receptacles for sample analysis, particularly sample tubes. The automated systems have become quite sophisticated in their ability to perform several different analyses and how the receptacles are transported, manipulated and stored. The vessels may also be transported to be stored within a separate sample storage device which may also be responsible for discarding some or all of the stored samples after a certain period of time. There is a continuous desire to increase the autonomous operation span of both such devices. Accordingly, efforts have been made to increase the capacity of receptacle storages, additive tanks, etc.

Attention has also been paid to the waste management of such automated devices and storages. In pursuit of longer unattended analysis runs, the waste capacity of automated chemical analysis devices and storages has increased. U.S. Pat. No. 8,423,174 B2, for example, discloses a waste bin handling system that rotates several waste bins so as to enable the operator to replace a full waste bin with an empty one in an attempt to maintain the ability to receive vast amounts of discarded receptacles.

SUMMARY

A novel waste bin carrier is proposed for carrying at least one waste bin, i.e. one waste bin or more. The waste bin carrier includes a frame having a base for receiving thereon one waste bin or more. The waste bin carrier also has a locking mechanism movably attached to the frame for releasably securing at least one waste bin to the waste bin carrier. The locking mechanism has a pusher guide that extends in a first horizontal Cartesian dimension for lateral engagement with the waste bin. The locking mechanism also has at least one articulated arm that connects the pusher guide to the frame of the waste bin carrier for allowing movement of the pusher guide in respect to the frame between the deployed state and the released state.

On the other hand, an automated receptacle handling system is also proposed having an automated receptacle handling device with a receptive space for receiving a waste bin carrier, a waste bin carrier for introduction into the receptive space of the automated receptacle handling device, and a locking mechanism movably attached to the automated receptacle handling device or to the waste bin carrier for releasably securing at least one waste bin to the waste bin carrier.

Considerable benefits are gained with the novel proposition. Modern automated laboratory storage systems may store more than 10.000 receptacles and dispose more than 4.000 receptacles per day. Accordingly, a single storage system may produce tens of kilograms of waste per day. With the novel arrangement, the filled waste bins are less strenuous to remove from the storage system as the bins are on a carrier, such as a wheeled trolley. Because the waste bin carrier features a locking mechanism, several waste bins may be easily loaded on, secured to and preferably positioned in respect to the carrier enabling the division of the load into more than one waste bin.

According to one embodiment the waste bin carrier is enabled to receive several waste bins. The waste load may thereby be divided between several waste bins which may be manipulated by hand thus removing the need to construct and maintain complicated automated waste management solutions.

BRIEF DESCRIPTION OF THE DRAWINGS

In the following exemplary embodiments are described in greater detail with reference to the accompanying drawings, in which.

EMBODIMENTS

Due to the nature of existing waste management solutions for automated chemical analysers and storages, the owners of such devices and the operators tending to the operation of the devices would benefit from a simpler and less strenuous approach to waste management. It is therefore an aim of at least some herein described embodiments to provide a simple and light waste management solution for an automated sample handling environment or at least provide the public with a useful alternative. Accordingly, an articulated locking mechanism of a waste bin carrier is proposed for engaging at least one particularly at least two waste bins laterally to position and secure the waste bin(s) to the waste bin carrier.

Suitable automated sample vessel handling devices include automated laboratory storage systems, chemical analysers, etc. A receptacle may be a sample receptacle, such as a sample tube or a cuvette, or another receptacle, such as a light flower pot, beverage container, etc. According to a particular embodiment, the sample receptacle is intended to contain a biological sample.

Figure 1:
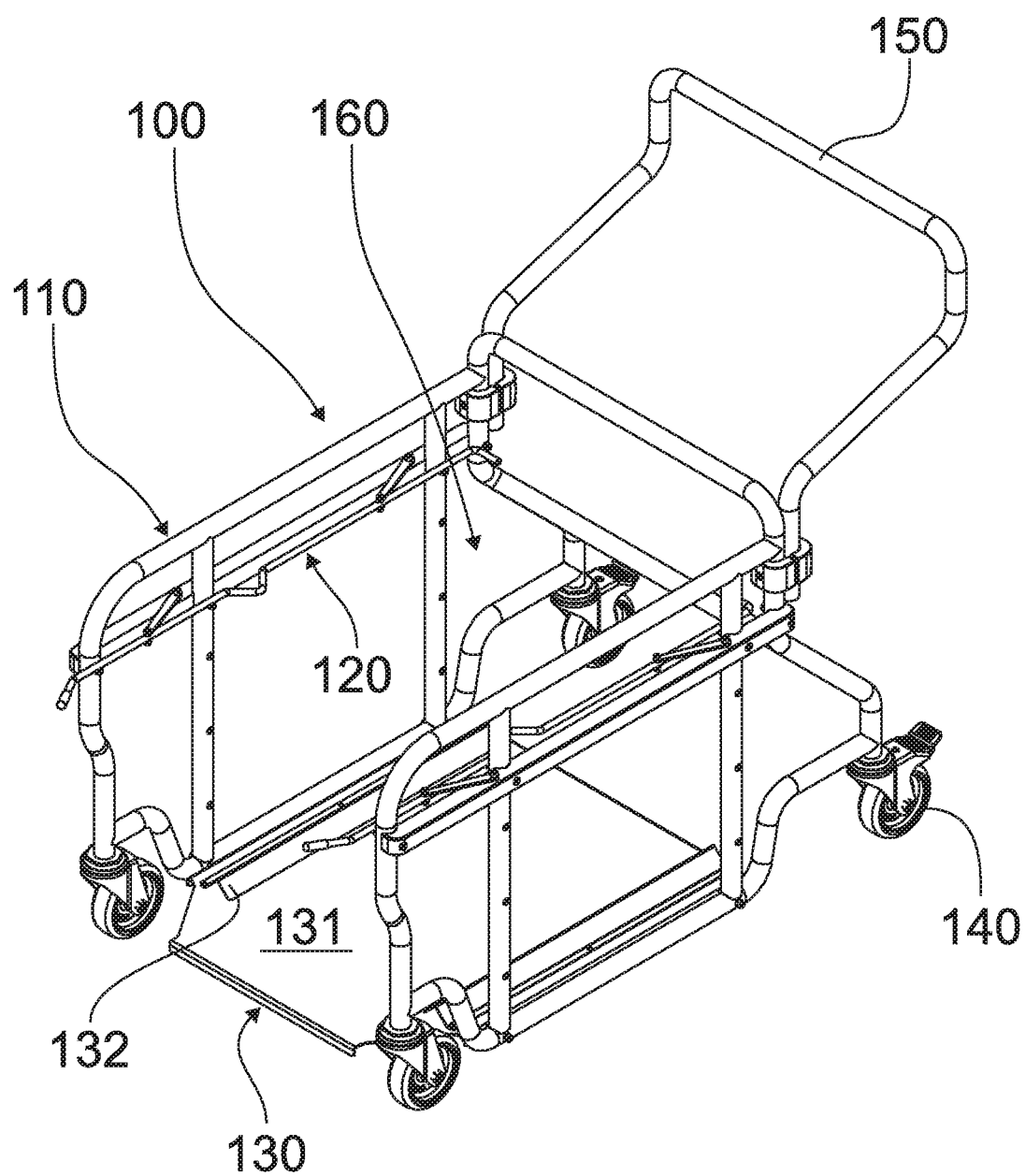
FIG. 1 illustrates a perspective view of a waste bin carrier in accordance with at least some embodiments of the present invention with the locking mechanism in a released state.

As shown in FIG. 1, the waste bin carrier 100 takes according to one embodiment the form of a trolley. Accordingly, the waste bin carrier 100 includes a frame 110 which is provided with wheels 140 for assisted handling. The frame 110 has a generally prismatic shape and open front and top ends. The frame 110 defines a carrier space 160 which is created between the lateral sides and the rear side. The carrier space 160 is open-ended in the sense that the front end of the frame 110 is left open for access into the carrier space 160. On the other hand the top end of the frame 110 is left open so that the waste bins loaded onto the waste bin carrier 100 may be accessible from above. Indeed, the lateral sides and the rear side of the frame 110 may be generally open and accessible or closed with a panel, mesh, etc. (not shown).

The bottom of the frame 110 is closed with a base 130. The base 130 has a platform 131 extending between the bottom ends of the lateral sides of the frame 110. The platform 131 is designed to receive and support waste bins above the ground. While it would be possible to provide a waste bin carrier 100 for only one waste bin, it is optional to include several waste bin positions on the base 130 so as to limit the weight and size of an individual waste bin. In the illustrated example, the base 130 has two successive waste bin positions for two respective waste bins. However, more waste bin positions could be foreseen by constructing a larger waste bin carrier. Indeed, one could foresee a matrix-like arrangement comprising, e.g. a four-by-four, a two-by-four, a two-by-two, or a one-by-three arrangement. The platform 131 is a generally flat supporting structure allowing for sliding movement between the platform 131 and a waste bin. The platform 131 may be solid as shown in the FIGURES or provided with apertures or constructed by a plurality of elongated supports or a mesh. The allowed movement is in the longitudinal dimension of movement of the waste bin carrier 100 which in the present context is referred to as the first horizontal Cartesian dimension X (see FIGS. 2 and 6). In other words, the loading direction leading from the open front end of the waste bin carrier 100 towards the closed rear end of the waste bin carrier 100 extends in the first horizontal Cartesian dimension X. Accordingly, the normal horizontal Cartesian dimension in respect to the first horizontal Cartesian dimension X is referred to as the second horizontal Cartesian dimension Z (see FIGS. 2 and 6).

The movement of the waste bins is limited in the second horizontal Cartesian dimension Z by a guide 132. The guide 132 may be provided as protrusions extending from the platform 131 along the first horizontal Cartesian dimension Z, having a height in the vertical Cartesian dimension and being spaced apart in the second Cartesian dimension Z so as to provide a track for the waste bins on the base 130. Alternatively, the guide may be provided as guiding elements attached to the frame (not shown).

The platform 131 may be further equipped for assisted movement between the base 130 and the waste bins. The surface of the platform may be polished or otherwise smoothened for reduced friction or it may be provided with rollers or similar bearings (not shown).

As shown in FIG. 1, the waste bin carrier 100 features a handle 150 at the rear of the carrier for manual propulsion. Alternatively, the waste bin carrier could be manipulated by a machine manipulator with a conveyor, robot, or similar device. FIG. 1 also reveals that the waste bin carrier 100 includes a locking mechanism 120 provided into the carrier space 160. In the illustrated embodiment both lateral sides of the frame 110 have been fitted with a locking mechanism 120. In other words, the waste bin carrier 100 has two locking mechanisms 120 attached to the frame 110 and opposing each other in the carrying space 160. More specifically, the two locking mechanisms 120 are configured to engage the waste bin or waste bins 200 from respective opposing sides in the second horizontal Cartesian dimension for securing the waste bin or waste bins 200 to the waste bin carrier 100.

Figure 2:
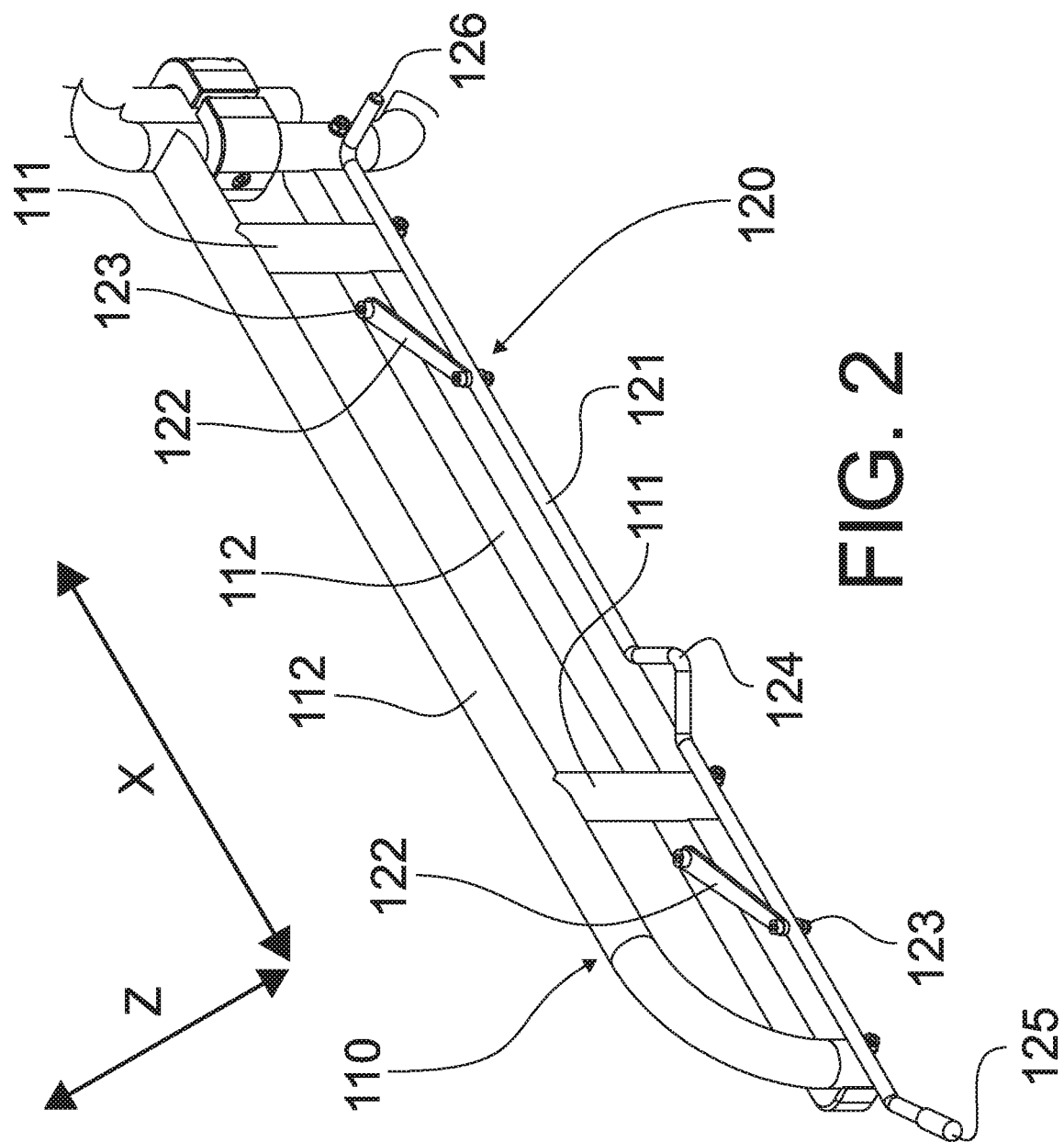
FIG. 2 illustrates a detail view of locking mechanism of the waste bin carrier of FIG. 1.

Turning now to FIG. 2 which shows details of the frame 110 and the thereto attached locking mechanism 120. Firstly it is to be noted that the frame 110 of the illustrated example includes a host of profiles attached to each other to form a network that makes up the carrier frame. The profiles may be hollow tubes or similar members that are joined to each other by welding, tight fits or removable attachment means, such as clamps, threads, etc. The frame 110 therefore includes generally vertical frame members 111 and generally horizontal frame members 112. The locking mechanism 120 is movably attached to the frame 110, e.g. to a horizontal frame member 112. The locking mechanism 120 includes a pusher guide 121. The pusher guide 121 may be a pusher guide beam, a pusher guide wire, a pusher guide bar, a pusher guide rod, or a comparable elongated member. In practice, the pusher guide 121 may be a shaped wire so as to be as light as possible. As illustrated in FIG. 2, the pusher guide 121 is elongated and extends in the first horizontal Cartesian dimension X. The pusher guide 121 has a leading end 125 provided at the front end of the waste bin carrier 100 that is optionally shaped to engage a corresponding switch or stop in the automated sample handling device 300 to record the assumed position. The pusher guide 121 also has a trailing end 126 at the opposing end. The trailing end 126 may include a handle, such as the illustrated angled portion, for assisted manipulation.

Figure 5:
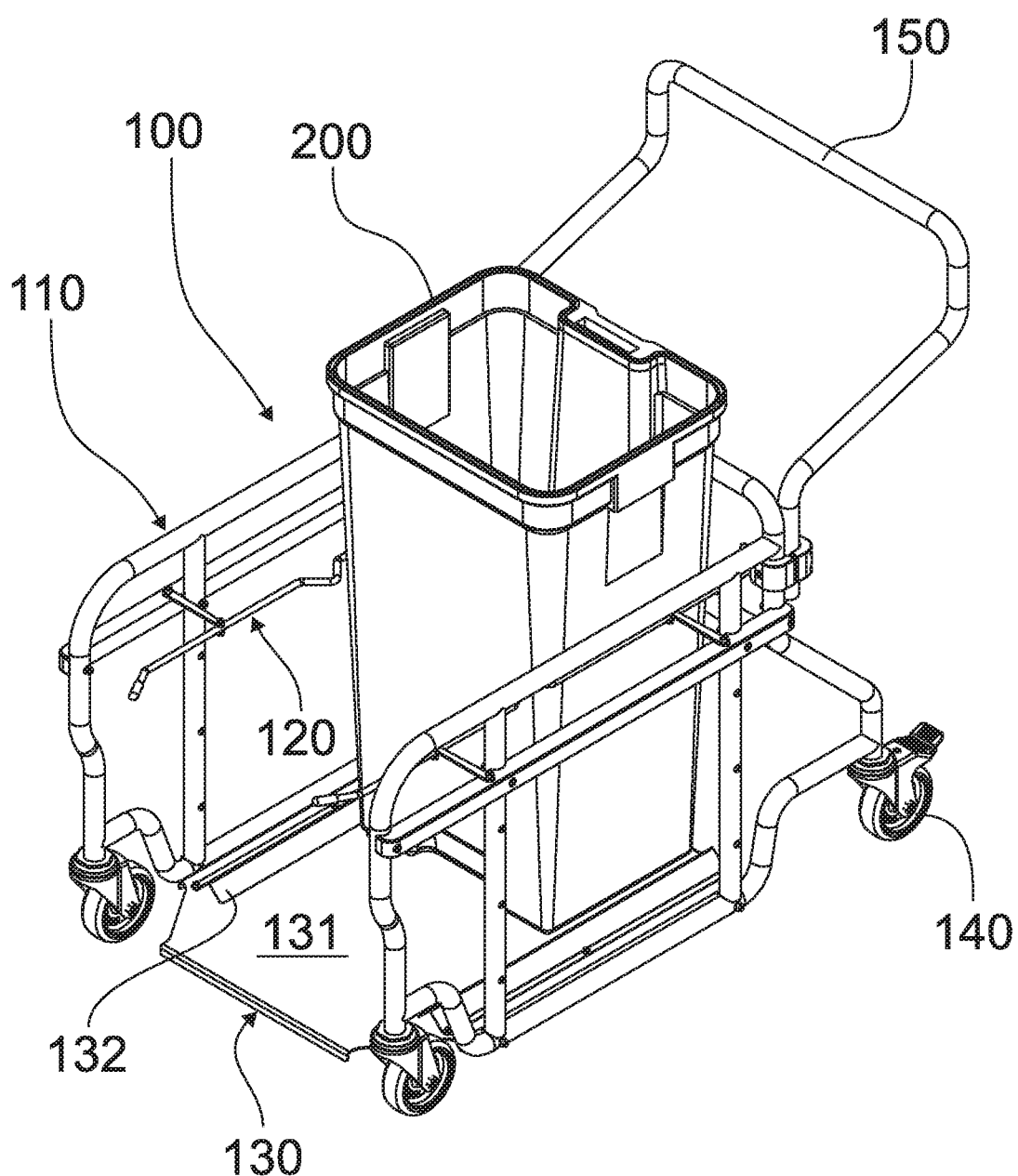
FIG. 5 illustrates a perspective view of the waste bin carrier of FIG. 3 carrying one waste bin.
Figure 6:
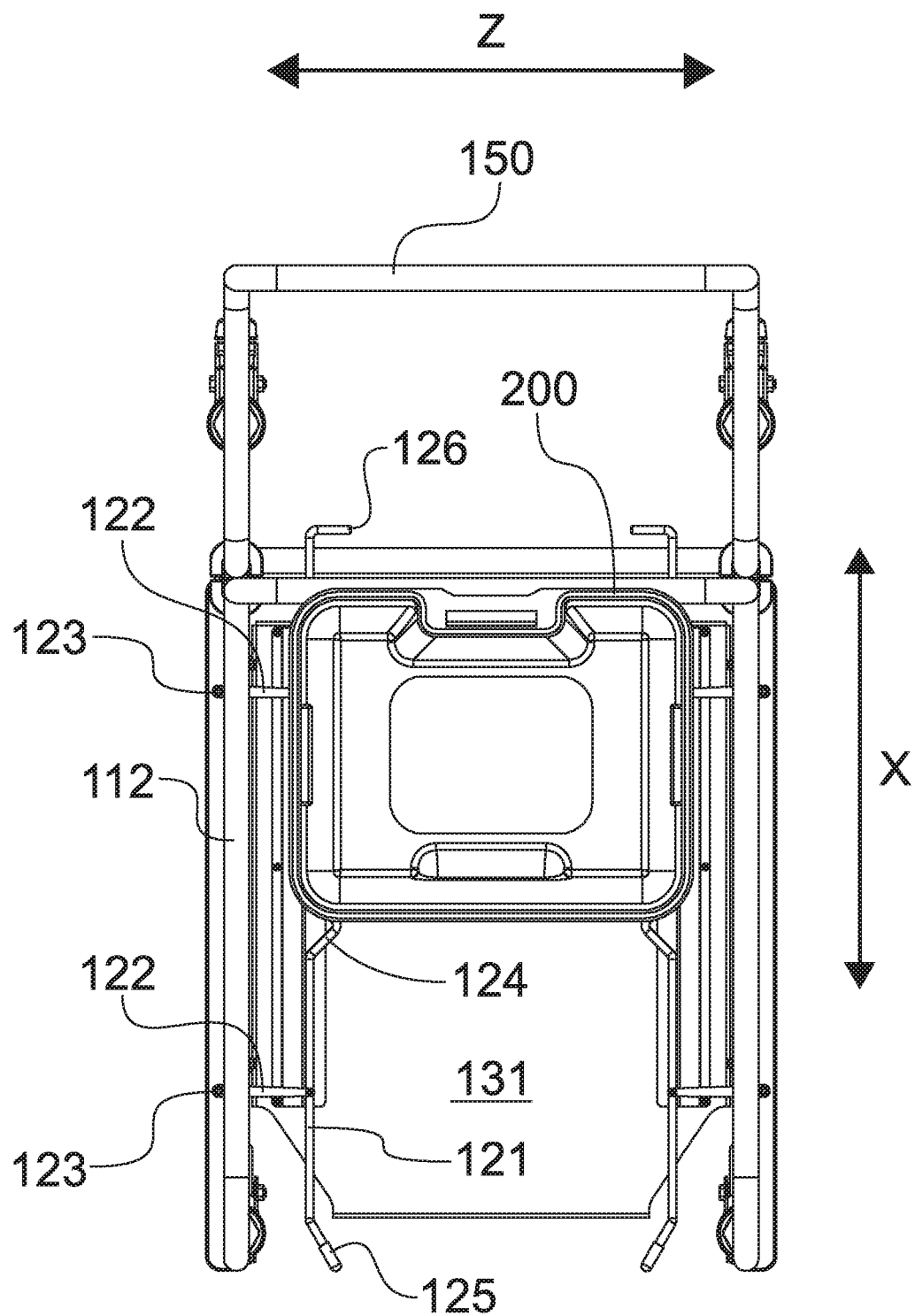
FIG. 6 illustrates a top elevation view of the waste bin carrier of FIG. 5.
Figure 7:
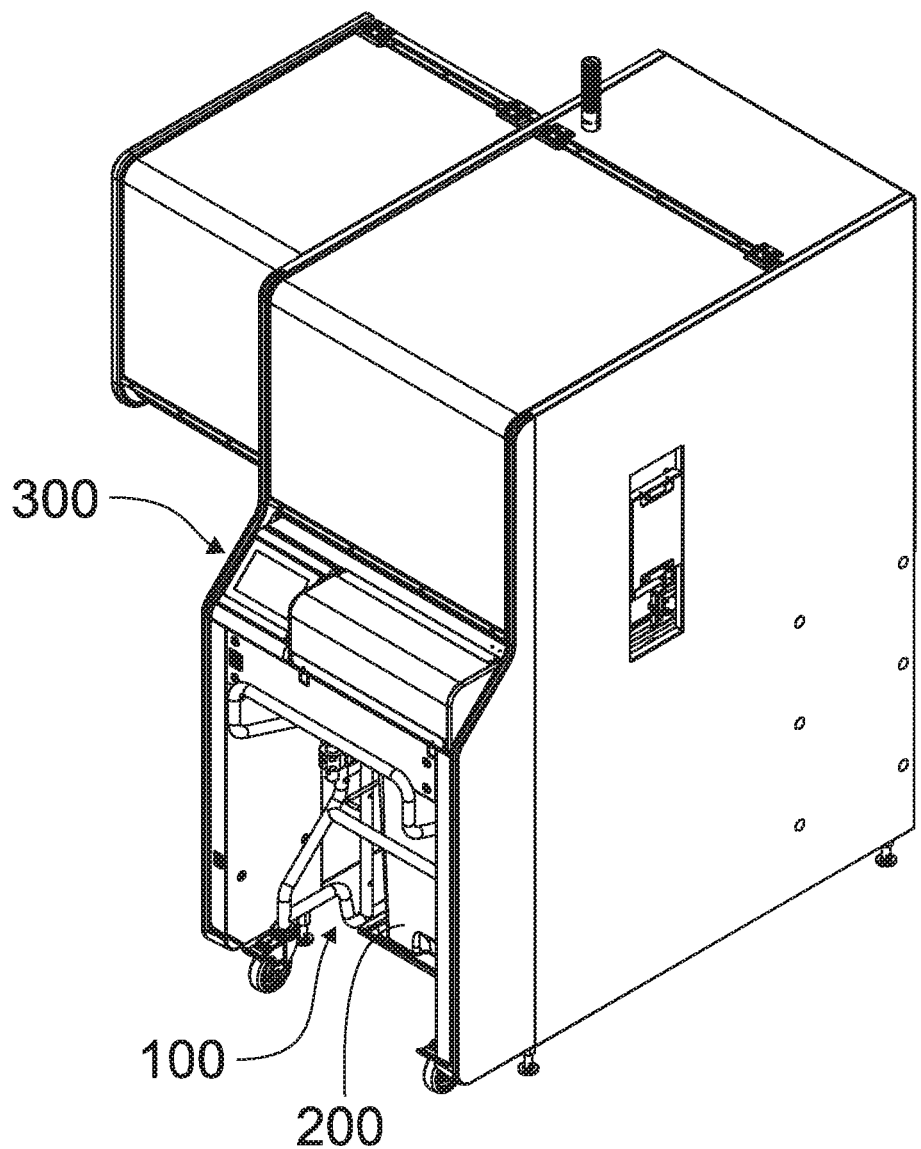
FIG. 7 illustrates a perspective view of the waste bin carrier of FIG. 4 installed in an automated receptacle handling device.

The elongated pusher guide 121 is shaped to engage the lateral side of the waste bins. Accordingly, the pusher guide 121 features a separator 124 extending in the second horizontal Cartesian dimension Z into the carrying space 160. The purpose of the separator 124 is to wedge into a gap or recess between two successive waste bins 200 thus positioning the waste bins 200 on the base 130. This effect is best shown in FIGS. 5 and 6. According to the simple embodiment of FIG. 2, the separator 124 takes the form of a kink or angled protuberance in the shape of the pusher guide 121.

As mentioned above, the locking mechanism 120 is movably attached to the frame 110 for releasably securing the waste bins 200 thereto. According to the illustrated embodiment, the locking mechanism 120 has at least one articulated arm 122 which connects the pusher guide 121 to the frame 110 so as to allow movement of the pusher guide 121 in respect to the frame 110 between a deployed state and a released state. In the illustrated embodiment there are two of said articulated arms 122 for added stability. The successively arranged in arms 122 are spaced apart in the first horizontal Cartesian dimension X. The arms 122 are articulated from both ends about respective vertical horizontal Cartesian axes. While other degrees of freedom are possible, they are not enabled in the shown example. The purpose of the two-ended hinge arm is to abduct and retract the pusher guide 121 in respect to the frame 110 to move the locking mechanism 120 between a released (FIG. 1) and deployed (FIG. 3) configuration, respectively. On the one hand the arm 122 moves the pusher guide 121 through a path that has a component in the first horizontal Cartesian dimension X. This means that the arm 122 will move the pusher guide 121 forwards and backwards in the loading direction of the waste bin carrier 100. In the released position, in the leading end 125 of the pusher guide 121 extends outside the periphery of the frame 110 through the open side thereof (FIGS. 1 and 2). The purpose of the reach is to make contact with the receiving automated receptacle handling device 300 so as to indicate that the waste bin carrier 100 has assumed its position. In the deployed position, the leading end 125 of the pusher guide 121 is retracted in the first horizontal Cartesian dimension X towards the carrying space 160 (FIGS. 3 to 6). More specifically, the leading end 125 may be within the carrying space 160, i.e. delimited by the frame 110, when the locking mechanism 120 is in the deployed state. On the other hand the arm 122 the moves the pusher guide 121 through a path that has a component in a second horizontal Cartesian dimension Z. This means that the arm 122 will move the pusher guide 121 closer to and farther from the frame 110 and respectively farther from and closer to the opposing locking mechanism. This movement makes the locking mechanism 120 grab the waste bins 200 laterally.

The locking mechanism may be provided to the sample bin carrier or to the automated receptacle handling device both making up an automated receptacle handling system. Examples of automated receptacle handling device include warm storages, cold storages, automated refrigerators, analysers, automated incubation devices, etc.

The use of the device and system is simple. When the automated receptacle handling device 300 indicates that the waste bins 200 are to be emptied, the waste bin carrier 100 is grabbed by the handle 150 and withdrawn from the automated receptacle handling device 300 by pulling, which movement is assisted by the wheels 140. With the waste bin carrier 100 exposed, the waste bin or waste bins 200 are removed. First, the locking mechanism 120 is released by pushing the pusher guide 121 towards the front end of the waste bin carrier 100 from the trailing end 126 or pulling from the leading end 125. The hinged connection between the pusher guide 121 and the arms 122 and between the arms 122 and the frame 110 allows the arms 122 to turn about the vertical axis so as to bring the pusher guides 121 towards the front of the waste bin carrier 100 and towards the frame 110. Accordingly, the opposing pusher guides 121 of the locking mechanism are retracted from the waste bins 200 and from each other. Now the locking mechanism 120 assumed the released state as depicted by FIG. 1. Next, the filled waste bins 200 may be removed from the base 130 by lifting the waste bins 200 over the frame 110 or optionally by sliding the waste bins 200 along the platform 131 and out the front end of the waste bin carrier 100.

Figure 3:
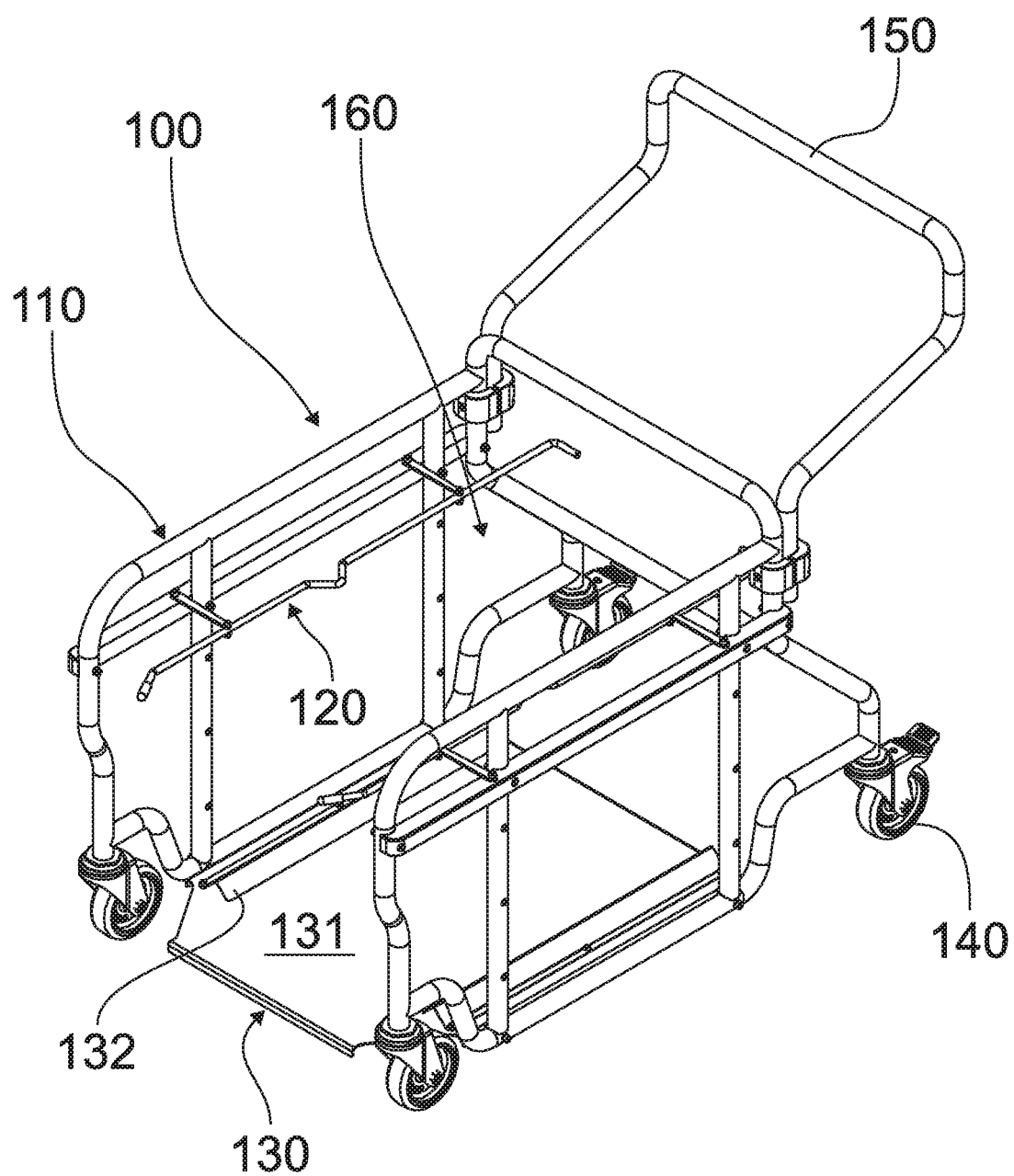
FIG. 3 illustrates a perspective view of the waste bin carrier of FIG. 1 with the locking mechanism in a deployed state.
Figure 4:
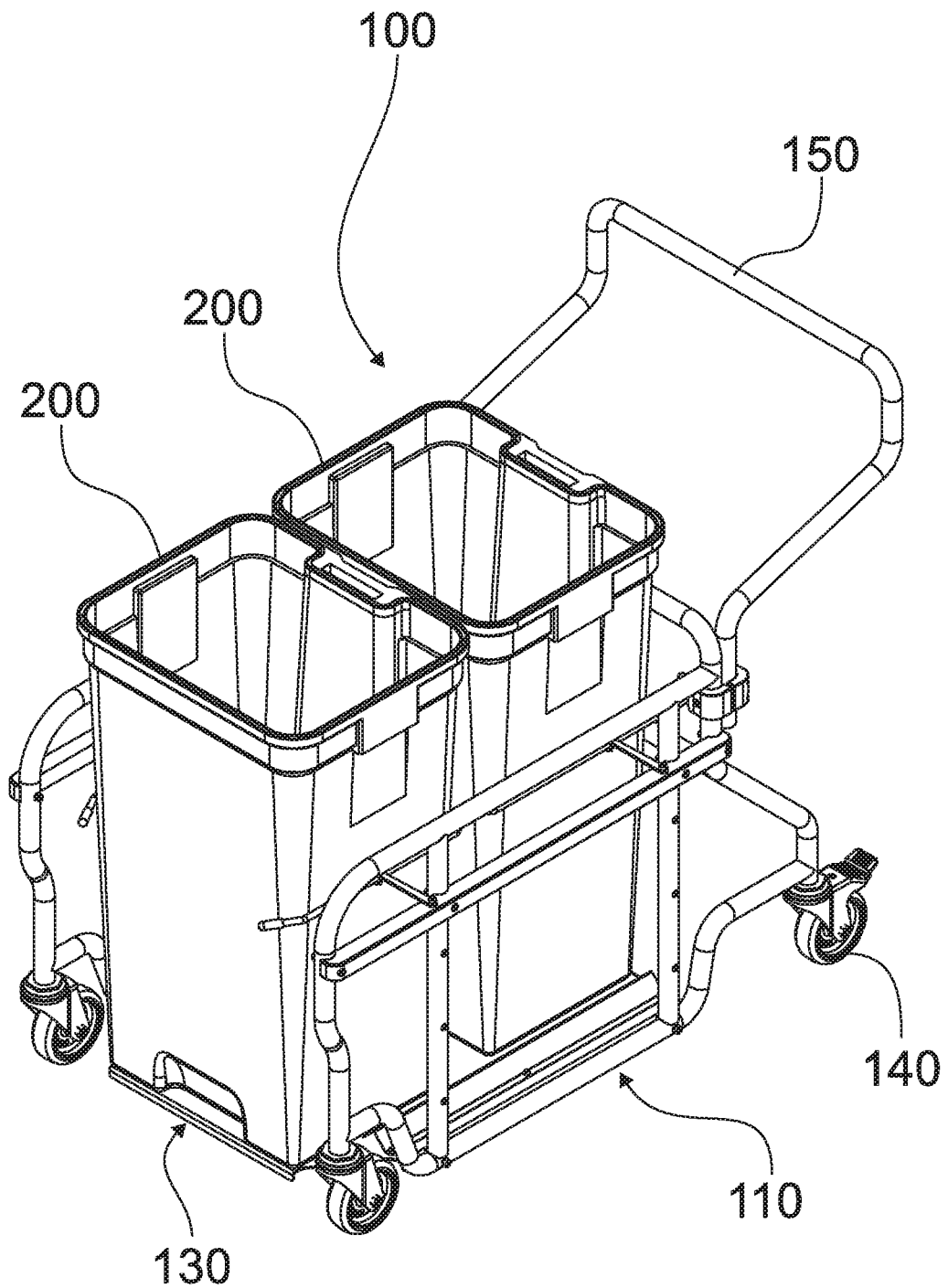
FIG. 4 illustrates a perspective view of the waste bin carrier of FIG. 3 carrying two waste bins.

Loading is performed in a reversed order. The empty waste bins 200 are loaded onto the base 130 by lifting over the frame 110 or optionally by sliding them in along the platform 131. The waste bins 200 are positioned and secured to the waste bin carrier 100 by moving the locking mechanism 120 from the released state (FIG. 1) into the deployed state (FIG. 3). This may be done manually before or during the insertion of the waste bin carrier 100 into the receptive space of the automated receptacle handling device 300. When the user pushes the waste bin carrier 100 into the automated receptacle handling device 300, the leading ends 125 of the pusher guides 121 if not already retracted to the deployed state will make contact with a cooperating surface of the automated receptacle handling device 300. The cooperating surface or any other enclosing part of the automated receptacle handling device 300 may include a sensor, such as an optical sensor, for sensing the presence of the waste bin carrier. As the pushing movement continues, the pusher guides 121 are guided from the released position into the deployed position by the arms 122 which rotate about the vertical axis so as to bring the pusher guides 121 closer to each other and further back towards the rear of the waste bin carrier 100. Now the pusher guides make contact with the lateral surface of the waste bins 200. Should the waste bins 200 be located slightly out of position on the base 130, the wedged shape of the separator 124 will wedge into the gap between the waste bins 200 to urge the empty and thus light waste bins 200 on the platform 131 to the correct position in the first Cartesian dimension X. Since the waste bins 200 are typically made from a polymer material which is inherently flexible, the user will receive haptic feedback through the handle 150 or through the locking mechanism 120, if there is a problem with the positioning, e.g. if the separator 124 does not slot into place. If the waste bin carrier 100 is loaded normally, the user will notice the trailing end 126 of the locking mechanism 120 assume its rearmost position in the first Cartesian dimension X indicating that the waste bin carrier 100 has arrived to the loaded position and that the waste bins 200 are secured. Another indication is the position of the handle 150 in respect to the automated receptacle handling device 300.

Several variations to the illustrated and above described embodiments are foreseen. For example, instead of squeezing the waste bins 200 from the lateral sides in the second Cartesian dimension Z and loading and unloading the waste bin carrier 100 in the first Cartesian dimension X, it could be possible to reverse the structure. It is foreseen to open a lateral side of the waste bin carrier to allow for loading and unloading in the second Cartesian dimension Z and to provide the front end of the waste bin carrier with a locking mechanism (not shown). The locking mechanism could take the form a movable member that upon contact with the automated receptacle handling device would secure the waste bins towards the rear end of the waste bin carrier. In such an embodiment it would be optional to provide the waste bin carrier with some sort of a divider (not shown) dividing the carrying space in the first Cartesian dimension X. The divider could be stationary or movable between a deployed and released state.

Also foreseeable is an embodiment making use of a single articulated pusher guide, i.e. a one-sided locking mechanism holding the waste bin or bins from one lateral side.

Yet a further foreseeable variation would be to arrange the locking mechanism to the automated receptacle handling device instead of the waste bin carrier. The automated receptacle handling device would comprise a receptive space for receiving the waste bin carrier. The receptive space would be delimited walls which would house the locking mechanism. While being equally or nearly as capable of positioning the waste bins to the waste bin carrier as the illustrated embodiment, such an embodiment would lose the ability to secure the waste bins to the carrier during transit.

According to an advanced embodiment, the locking mechanism is equipped with biasing elements, such as springs, that are configured to bias the arms towards one or both extreme position(s). The pusher guides would then be urged towards the deployed or released state or both. The biasing element may be provided between the arm and the frame.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

REFERENCE SIGNS LIST 100 waste bin carrier
110 Frame
111 vertical frame member
112 horizontal frame member
120 locking mechanism
121 pusher guide
122 Arm
123 Hinge
124 Separator
125 leading end
126 trailing end
130 Base
131 Platform
132 Guide
140 Wheel
150 Handle
160 carrying space
200 waste bin
300 automated receptacle handling device
X first horizontal Cartesian dimension
Z second horizontal Cartesian dimension

CITATION LIST

U.S. Pat. No. 8,423,174 B2

The invention claimed is:
1. A waste bin carrier for carrying at least one waste bin, the waste bin carrier comprising:
  a frame,
  a base attached to the frame and being configured to receive thereon the at least one waste bin,
  a locking mechanism movably attached to the frame for releasably securing at least one waste bin to the waste bin carrier, which locking mechanism comprises:
    a pusher guide extending in a first horizontal Cartesian dimension for lateral engagement with the at least one waste bin, and
    at least one articulated arm connecting the pusher guide to the frame of the waste bin carrier, the articulated arm being configured to pivot so as to translate the pusher guide in respect to the frame between a deployed state and a released state,
wherein:
  the locking mechanism is configured to be manipulated between:
    a deployed state, in which the locking mechanism engages the at least one waste bin, and
    a released state, in which the locking mechanism is disengaged from the at least one waste bin,
  in the released state the pusher guide is proximal to the frame, and wherein
  in the deployed state the pusher guide is distanced from the frame in a second horizontal Cartesian dimension.
2. The waste bin carrier according to claim 1, wherein the waste bin carrier further comprises a guide for limiting the movement of the at least one waste bin on the base in the second horizontal Cartesian dimension.
3. The waste bin carrier according to claim 1, wherein the base comprises a platform for receiving and supporting thereon the at least one waste bin above ground, which platform allows movement of the at least one waste bin in respect to the platform in the first horizontal Cartesian dimension.
4. The waste bin carrier according to claim 3, wherein the guide is provided on the platform so as to form a track extending in the first horizontal Cartesian dimension.
5. The waste bin carrier according to claim 1, wherein the frame defines a carrying space for receiving the at least one waste bin.
6. The waste bin carrier according to claim 5, wherein the carrying space comprises a plurality of waste bin positions for a respective plurality of waste bins.
7. The waste bin carrier according to claim 5, wherein the locking mechanism is provided in the carrying space.
8. The waste bin carrier according to claim 1, wherein the at least one articulated arm is configured to move the pusher guide through a path that comprises a component in the first horizontal Cartesian dimension, in the second horizontal Cartesian dimension, or both in the first and second horizontal Cartesian dimension.
9. The waste bin carrier according to claim 1, wherein the locking mechanism comprises at least two of said articulated arms arranged in a successive and spaced apart configuration in the first horizontal Cartesian dimension for added stability.

10. The waste bin carrier according to claim 1, wherein the pusher guide comprises a separator extending from the pusher guide in the second horizontal Cartesian dimension into the carrying space so as to wedge into a gap or recess between two successive waste bins for positioning the waste bins on the base.

11. The waste bin carrier according to claim 1, wherein:
the frame comprises an open side for access to the carrying space,
the pusher guide comprises a leading end arranged in the vicinity of the open side of the frame, and wherein
the at least one articulated arm is configured to guide the pusher guide between:
a released position, in which the leading end of the pusher guide extends outside the periphery of the frame through the open side thereof, and
a deployed position, in which the leading end of the pusher guide is retracted in the first horizontal Cartesian dimension towards the carrying space.

12. The waste bin carrier according to claim 1, wherein the locking mechanism comprises two such articulated pusher guides provided to opposing sides of the carrying space so as to engage the at least one waste bin from respective opposing sides for securing the at least one waste bin to the waste bin carrier.

13. The waste bin carrier according to claim 1, wherein the waste bin carrier is configured to be received by an automated receptacle handling device.

14. The waste bin carrier according to claim 1, wherein the waste bin carrier further comprises wheels for rolling the waste bin carrier in and out of an automated receptacle handling device.

15. An automated receptacle handling system comprising:
an automated receptacle handling device comprising a receptive space for receiving a waste bin carrier,
a waste bin carrier configured to be introduced into the receptive space of the automated receptacle handling device, wherein the waste bin carrier comprises:
a frame,
a base attached to the frame and being configured to receive thereon the at least one waste bin, a locking mechanism movably attached to the frame for releasably securing at least one waste bin to the waste bin carrier,
a pusher guide extending in a first horizontal Cartesian dimension for lateral engagement with the at least one waste bin, and
at least one articulated arm connecting the pusher guide to the frame of the waste bin carrier, the articulated arm being configured to pivot so as to translate the pusher guide in respect to the frame between a deployed state and a released state, and
a locking mechanism movably attached to the waste bin carrier for releasably securing at least one waste bin to the waste bin carrier, wherein the locking mechanism is configured to be manipulated between:
a deployed state, in which the locking mechanism engages the at least one waste bin and the pusher guide is distanced from the frame in a second horizontal Cartesian dimension, and
a released state, in which the locking mechanism is disengaged from the at least one waste bin and the pusher guide is proximal to the frame.

16. The automated receptacle handling device according to claim 15, wherein the automated receptacle handling device is configured to transport and store sample receptacles.

17. An automated receptacle handling system comprising:
an automated receptacle handling device comprising a receptive space for receiving a waste bin carrier,
a waste bin carrier configured to be introduced into the receptive space of the automated receptacle handling device, and
a locking mechanism movably attached to the automated receptacle handling device or to the waste bin carrier for releasably securing at least one waste bin to the waste bin carrier, wherein the waste bin carrier comprises:
a frame,
a base attached to the frame and being configured to receive thereon the at least one waste bin, a locking mechanism movably attached to the frame for releasably securing at least one waste bin to the waste bin carrier,
a pusher guide extending in a first horizontal Cartesian dimension for lateral engagement with the at least one waste bin, and
at least one articulated arm connecting the pusher guide to the frame of the waste bin carrier, the articulated arm being configured to pivot so as to translate the pusher guide in respect to the frame between a deployed state and a released state,
wherein:
the locking mechanism is configured to be manipulated between:
a deployed state, in which the locking mechanism engages the at least one waste bin, and
a released state, in which the locking mechanism is disengaged from the at least one waste bin,
in the released state the pusher guide is proximal to the frame, and wherein
in the deployed state the pusher guide is distanced from the frame in a second horizontal Cartesian dimension.

* * * * *